W. K. McIVER.
LIGHTING SYSTEM AND MEANS FOR CONTROLLING THE SAME.
APPLICATION FILED OCT. 14, 1916.
1,399,505.
Patented Dec. 6, 1921.
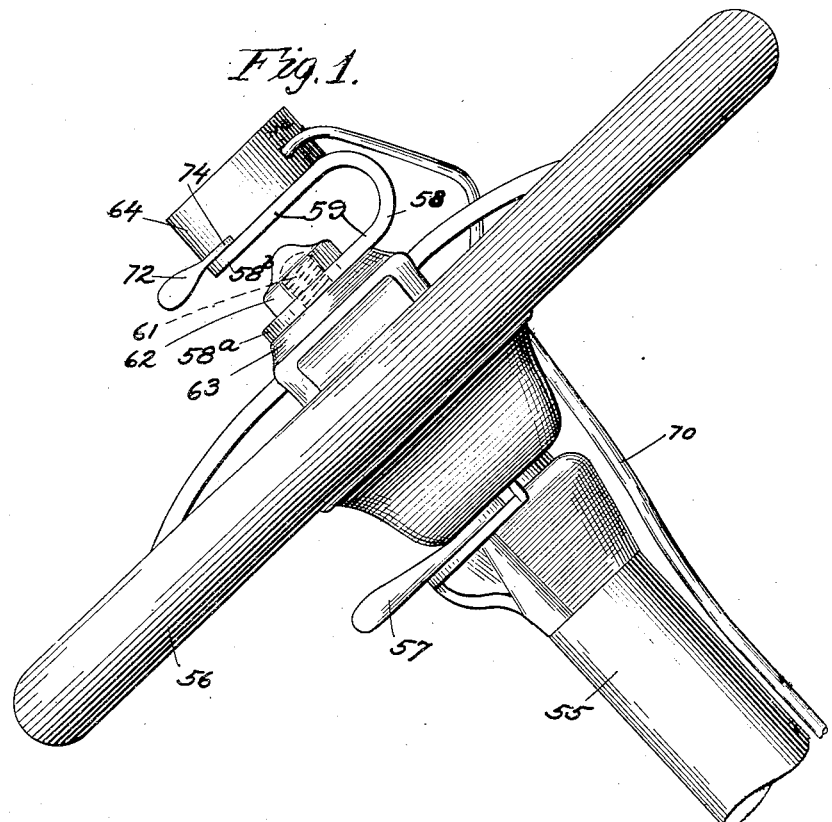
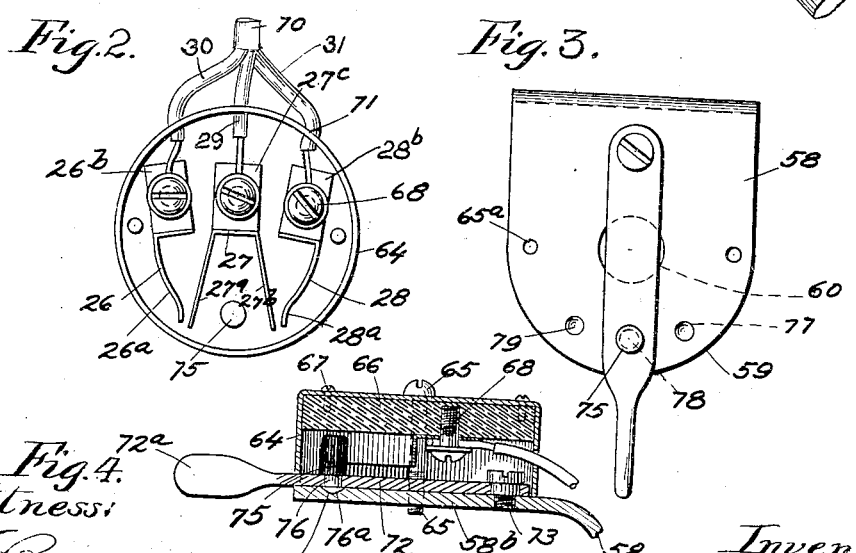
Witness:
Burnap
Inventor:
By William K. McIver
Sheridan, Wilkinson & Scott, Attys

UNITED STATES PATENT OFFICE.

WILLIAM K. McIVER, OF ELGIN, ILLINOIS, ASSIGNOR, BY MESNE ASSIGNMENTS, TO STEWART-WARNER SPEEDOMETER CORPORATION, OF CHICAGO, ILLINOIS, A CORPORATON OF VIRGINIA.

LIGHTING SYSTEM AND MEANS FOR CONTROLLING THE SAME.

1,399,505.  Specification of Letters Patent.  Patented Dec. 6, 1921.

Application filed October 14, 1916. Serial No. 125,724.

*To all whom it may concern:*

Be it known that I, WILLIAM K. McIVER, a citizen of the United States, residing at Elgin, in the county of Kane and State of Illinois, have invented certain new and useful Improvements in Lighting Systems and Means for Controlling the Same, of which the following is a specification.

This invention relates to a switch for electric lighting systems and its purpose is to provide an improved two-way or three-way switch adapted for use with the lighting systems of automobiles and capable of being mounted upon the upper end of the steering column thereof.

The principal object of the invention is to provide an improved switch which is simple in construction and which is capable of being operated to establish electrical connection between any selected pair of electric conductors. Still another object is to provide a switch having a series of flexible vanes or blades which are moved into connection with each other by the movement of an operating member. Other objects relate to various features of construction and arrangement which will appear more fully hereinafter.

The various objects of my invention will be set forth more clearly in the following specification, taken in connection with the accompanying drawings, in which one embodiment of the invention is illustrated.

In the drawings—

Figure 1 shows a side elevation of the steering column and steering wheel of an automobile, with the controlling means of my improved lighting system mounted in operative position thereon.

Fig. 2 shows an inverted plan view of the cap member of my improved controlling switch and of parts carried thereby.

Fig. 3 is a top plan view of the bracket member upon which the cap member of Fig. 2 is mounted; and Fig. 4 is a vertical sectional view, taken longitudinally of the automobile through my improved controlling switch when the latter is mounted in operative position.

In Fig. 1 of the drawings I have shown the usual steering column 55 of an automobile, carrying the steering wheel 56, control lever 57, and other well known parts. For the purpose of rendering the operation of my improved lighting system convenient, I have mounted the controlling switch 25 upon the upper end of the steering column above the steering wheel 56. The mounting of the switch in this position is effected by means of the U-shaped bracket member 58, which may be conveniently formed from a sheet of metal having curved extremities 59, by bending the same into the form illustrated particularly in Fig. 1. The lower parallel plate 58ª of this bracket member is provided with an aperture 60, which is adapted to receive the usual threaded stud 61 projecting upwardly from the steering column or the steering wheel on the upper side of the steering wheel, and which is normally engaged by the nut 62. The bracket member of my improved switch may be conveniently applied by removing this nut 62, placing the bracket member on the upper end of the hub 63 of the steering wheel, and then replacing the nut 62 on the stud in position to clamp the bracket member in the position illustrated in the drawings.

My improved switch also comprises a cylindrical cap member 64, which is open at its lower end and which seats upon the upper arm 58ᵇ of the bracket 58, the cap member being adapted to conform to the contour of the curved part 59 of the bracket member and being of substantially the same width as the bracket member, so that the latter forms a closure for the open end of the cap. The cap is secured in this position on the bracket member by means of the screws 65 engaging the threaded holes 65ª in the bracket. A plate 66 of insulating material is seated in the upper end of the cap 64, and is secured thereto by means of the screws 67. The contact members 26, 27, and 28, are mounted upon the insulating plate 66 within the cap member, and are held in position by means of screws 68, being arranged as shown in Fig. 2. The contact members 26 and 28 are similar to each other, but oppositely disposed, these parts comprising the plates 26ᵇ and 28ᵇ which are seated upon the insulating plate and have projecting resilient contact vanes or blades 26ª and 28ª, which are adapted to form electric connections with the diverging contact blades 27ª and 27ᵇ of the intermediate contact member 27, which also comprises a plate 27ᶜ adapted to seat upon the insulating plate. It will be understood that the screws 68 engage the insulating plate only, so that the contact members are insulated from each other and from the cap 64, and these screws serve also to secure the conductors 30, 29, and 31 in electric connection with the contact members 26, 27, and 28, respectively, these conductors being extended up the steering column in a suitable cable 70, and being introduced into the cap 64 through suitable apertures 71 which are provided in the wall thereof. Since the switch turns with the steering wheel, it is necessary to provide a limited amount of slack in the upper part of the cable 70.

The operating lever or member 72 of the switch is pivotally mounted upon the upper arm 58ᵃ of the bracket by means of a suitable screw 73, and this operating member comprises a suitable handle 72ᵃ, which projects from the cap 64 through an arcuate slot 74 formed in the wall thereof on the side adjacent the driver of the automobile. This operating member also carries an upwardly projecting insulating finger or pin 75, mounted on a metallic screw 76 which engages the arm 72, and the lower end 76ᵃ of which extends below the lower surface of said arm to ride upon the upper surface of the bracket member 58. The upper surface of the bracket is provided with three depressions 77, 78, and 79, any one of which may be engaged by the projection 76ᵃ, whereby the operating member 72 will be held in a corresponding position, it being understood that the member 72 is sufficiently resilient to permit being moved from one position to another.

When the member 72 is moved to a position where the projection 76ᵃ engages the depression 77, the resilient blade 27ᵃ of the contact member 27 will be moved into contact with the blade 26ᵃ of the contact member 26 and thus establish a connection between the conductors 29 and 30.

When the operating member is in its middle position with the projection 76ᵃ engaging the depression 78, the switch plates 26 and 27 automatically assume the open position illustrated in Fig. 2. When the lever 72 of the switch is moved to a position where the portion 76ᵃ seats in the portion 79 in the bracket, the resilient blade 27ᵃ of the contact member 27 engages the blade 28ᵃ of the contact member 28, thereby establishing a connection between the conductors 29 and 31.

It will be apparent that one only of the contact members 26 and 28 can be connected to the contact member 27 at the same instant, and that the changes in the connection may be readily effected simply by moving the member 72 through a small arc. Since the switch is located directly above the hub of the steering wheel, the operating handle thereof will occupy the same relative position with respect to the axis of the steering wheel in all positions of the latter, so that it may be conveniently operated by the driver to control the operation of the lighting circuit in accordance with the conditions encountered by the automobile when in use. It will be apparent that it is an important advantage that the switch is mounted on the upper end of the steering column on the steering wheel.

Although I have shown and described a particular embodiment of my invention for purposes of illustration, it will be understood that it may be constructed in various forms without departing from the scope of the invention as defined in the appended claims.

I claim:

1. An electric switch comprising a supporting plate, a cap mounted above said plate, an insulating member mounted within said cap, flexible contact members mounted on said insulating member, and an operating member mounted on said plate and having a part for actuating said contact members.

2. An electric switch comprising a plate adapted to be attached to a supporting member, an open-ended cap mounted in inverted position on said plate, an insulated base secured in the upper end of said cap, switch blades mounted on said base, and an operating member mounted on said plate for operating said switch blades.

3. An electric switch comprising a supporting plate, an open-ended cap mounted in inverted position on said plate, an operating member pivoted on said plate and having a part projecting upwardly therefrom within said cap member, a plurality of resilient contact members mounted on an insulated plate in said cap member and arranged to be connected to each other by the movement of said upwardly extending part, and means for forming electrical connections with said contact members.

4. An electric switch comprising a supporting plate, a cap member mounted on said plate, an insulating plate mounted within the cap member and provided with median and lateral contact elements, the median element having two flexible parts extending therefrom, and an operating lever mounted on the supporting plate and having a part projecting laterally therefrom and extending between the parts of the median contact element for causing each such flexible part to contact with its respective lateral contact element when the lever is operated.

5. An electric switch comprising a plate adapted to be attached to a supporting member, an open ended cap mounted in inverted position on said plate, an insulating plate secured within the upper end of said cap member and provided with median and lateral contact elements, the median element having two flexible parts extending therefrom, an operating lever mounted on the first named plate and having a part projecting laterally therefrom and extending between the parts of the median contact element for causing each such flexible part to contact with its respective lateral contact element when the lever is operated.

In testimony whereof, I have subscribed my name.

WILLIAM K. McIVER.